United States Patent Office 3,525,242
Patented Aug. 25, 1970

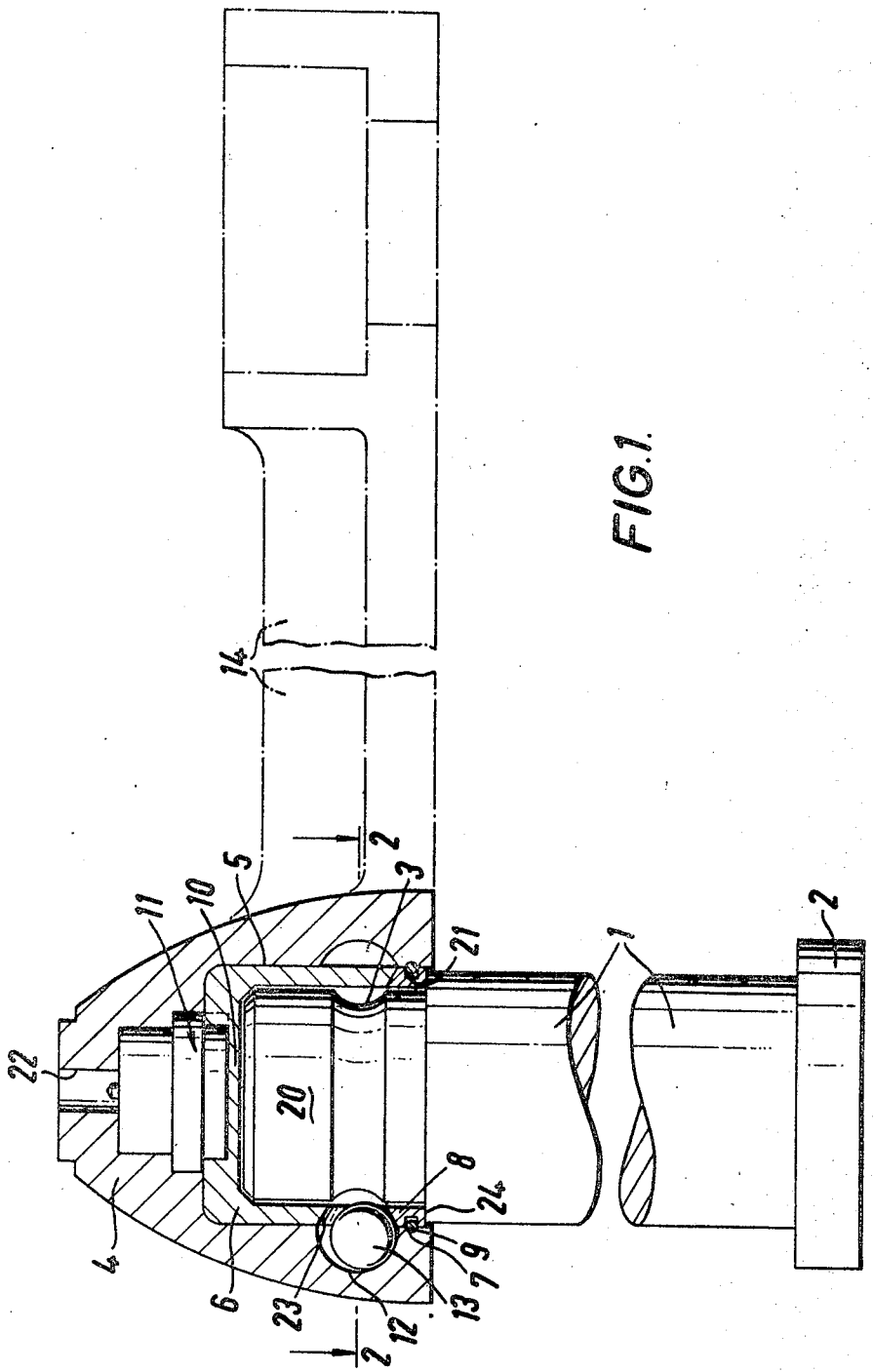

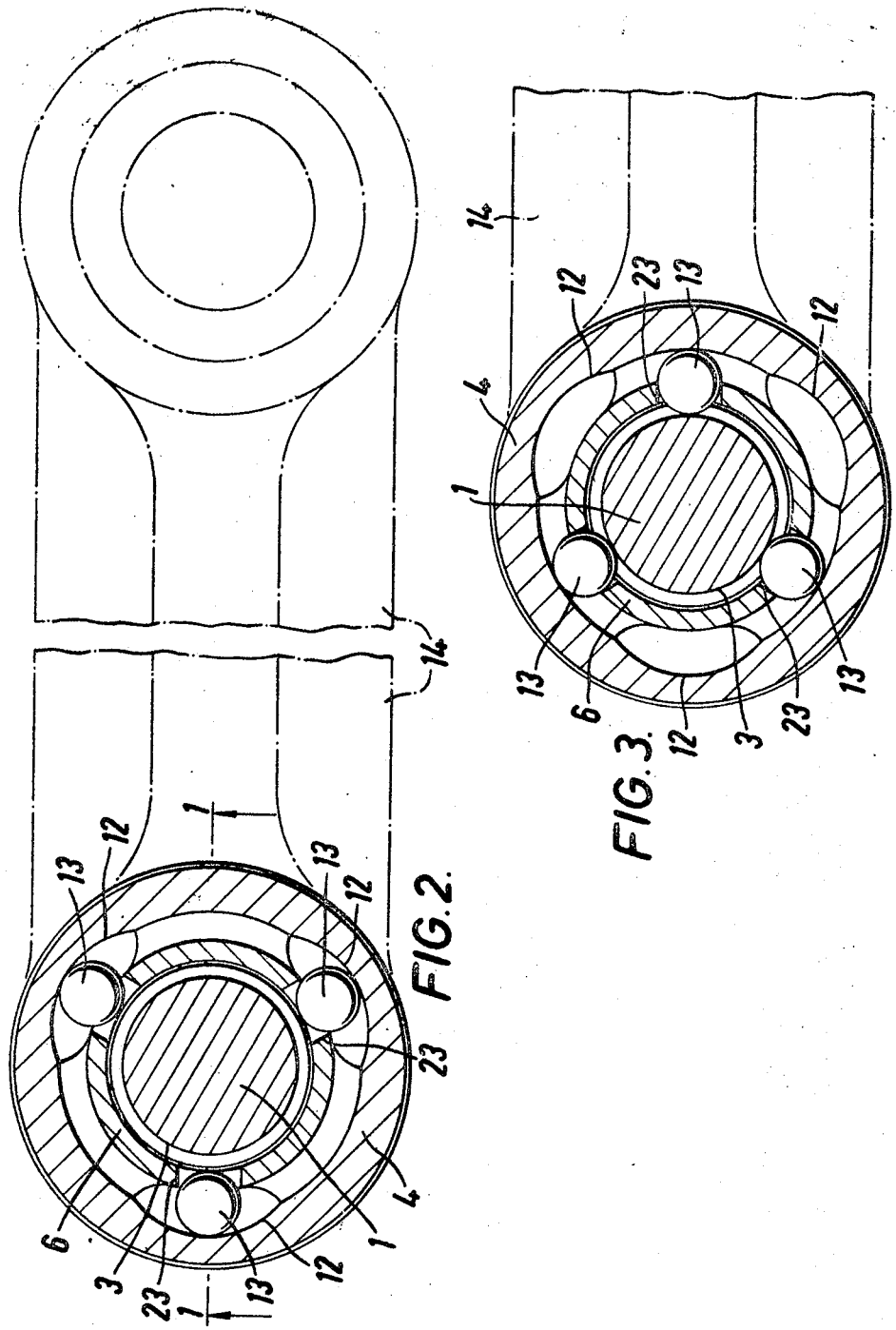

3,525,242
LOCKS
Leonard Weare Young, London, England, assignor to Bramah Security Equipment Limited, London, England, a British company
Filed July 5, 1968, Ser. No. 742,652
Int. Cl. F16b *41/00*
U.S. Cl. 70—231    3 Claims

ABSTRACT OF THE DISCLOSURE

A locking assembly comprising a bolt, a socket adapted to receive an end part of the bolt, a lining for the socket movable relatively thereto and detent means movable between an operative and an inoperative position in response to relative movement of the lining and the socket and adapted, in the operative position, to co-operate with the bolt end part to hold it in the socket.

---

The present invention relates to improvements in locks.

Our co-pending patent application No. 727,400 describes and claims a locking assembly comprising a bolt, a socket for receiving the bolt, detent means movable between an operative and an inoperative position and adapted in the operative position to co-operate with the bolt to hold the bolt in the socket, and key-operable means for holding the detent means in the operative position.

In accordance with the present invention inner and outer concentric members surround the socket and relative rotation, usually caused by a key, of the concentric members causes the detent means to move between the operative and inoperative positions. In an embodiment the detent means comprises a plurality, for example three, angularly spaced balls adapted in the operative position to seat in an annular recess on the part of the bolt received in the socket, relative rotative movement of the concentric members causing the balls to move radially in and out of the recess between the operative and inoperative positions.

A particular embodiment of the invention will now be described by way of example and with reference to the accompanying drawings wherein:

FIG. 1 is a sectional elevation of a locking assembly in accordance with the particular embodiment;

FIG. 2 is a section on the line II—II of FIG. 1 showing detent balls in an inoperative position; and FIG. 3 is a view similar to FIG. 2 showing the detent balls in an operative position.

The locking assembly shown in the drawings comprises an elongate cylindrical bolt 1 having at the rear end thereof a radially outwardly extending peripheral flange 2. The front end part 20 of the bolt is of reduced diameter. An annular peripheral recess 3 of semicircular cross section extends around the front end part 20.

A socket adapted to receive the front end part 20 of the bolt 1 is defined in a housing 4 of generally frusto-conical form having convex outer peripheral walls. This shape of housing renders it difficult to drill and to be engaged by an implement to break the assembly. A generally cylindrical bore 5 extends axially within the housing 4 and is open at the rear end thereof to receive the bolt. A cylindrical sleeve 6 fits concentrically within the bore 5, the sleeve 6 being capable of rotation within the bore 5. The internal diameter of the sleeve 6 is dimensioned to receive as a sliding fit the front end part 20 of the bolt 1. An annual recess 7 is formed on the inner peripheral walls of the bore 5 adjacent the rear end thereof. A ring 8 fits within the rear end part of the bore 5 and has an annular peripheral recess 21 which registers with the recess 7. A split ring 9 is located in the registering recesses 7 and 21 to retain the ring 8 against rearward withdrawal from the socket. The front end surface of the ring 8 abuts the rear end surface of the sleeve 6. The meeting surfaces of the ring and sleeve are chamfered. When the bolt is inserted, as shown in FIG. 1, the shoulder 24 defined behind the front end part 21 of the bolt 1 abuts the rear end surface of the ring 8. The inner peripheral surfaces of the walls of the sleeve 6, at the front end thereof, are joined by a disc-shaped web 10, the rear surface of the web 10 serving as an abutment for the front end surface of the bolt 1. A key-rotatable mechanism 11 of any suitable type is positioned behind the web 10. The mechanism 11 is rotationally fast with the sleeve 6. A key is inserted into an axial slot 22 at the front end of the housing 4.

Three evenly angularly spaced slots 23 extend rearwardly from the sleeve rear end surface. The inner surface of the bore 5 at a position axially aligned with the slots 23 has three angularly spaced part-spherical depressions 12. The front wall of each slot 23 is chamfered so that the bores defined between the retainer ring 8 and the sleeve 6 are of frusto-conical form (see FIG. 1) having the narrower end thereof inwardly disposed. The depressions 12 have an angular spacing corresponding to that of the slots 23 in the sleeve. A spherical ball 13 is trapped between the walls defining each slot 23 in the sleeve and the inner surface of the appropriate depression 12.

In use, when the sleeve 6 and the housing 4 are angularly positioned by the key-operated mechanism 11 relatively to one another in the inoperative position shown in FIG. 2 of the drawings wherein the slots 23 and the depressions 12 register, the balls 13 are free to move radially outwardly to a position such that the bolt 1 is free to enter and leave the sleeve 6. When the bolt is withdrawn the balls are trapped as the narrower inner ends of the frusto-conical bores referred to above have a smaller diameter than that of the balls. When the housing 4 and sleeve 6 are relatively rotated by the key-operated mechanism 11 to the operative position shown in FIG. 3 parts of the walls of the bore 5 between the depressions 12 register with the slots 23 and the balls 13 are urged radially inwardly so that the inner peripheral parts thereof seat in the annular recess 3 of the bolt 1 to lock the bolt in the sleeve.

The housing 4 and the bolt 1 may be held together by a chain to constitute a padlock. Alternatively parts of elements having registering bores may be juxtaposed, the bolt 1 inserted through the bores, the housing 4 being inserted over the bolt front end part 20 to lock the elements together. In the embodiment shown in the drawings the housing 4 is fixed to one end of a locking bar 14 which is attached to one of a pair of elements which are to be locked together. The bolt 1 may pass through a bore in the other element or be formed integrally with the element.

I claim:

1. A locking assembly comprising a cylindrical bolt, a cylindrical socket adapted to receive an end part of the bolt, a cylindrical lining sleeve for the socket rotatable relatively thereto, a key operated mechanism for causing rotational movement of the sleeve relative to the socket, and detent means movable between an operative and an inoperative position in response to relative rotation of the sleeve and the socket and adapted, in the operative position, to co-operate with the bolt end part to hold it in the socket.

2. A locking assembly as claimed in claim 1 wherein the detent means comprises a plurality of angularly spaced balls adapted in the operative position to seat in an annular recess on the bolt end part, rotative movement of the sleeve relatively to the socket causing or allowing the balls to move radially in and out of the recess.

3. A locking assembly as claimed in claim 2 wherein the socket walls are formed into a plurality of angularly spaced depressions and wherein a plurality of angularly spaced ball-receiving slots are formed through the sleeve walls, the balls in the operative position being trapped in the slots between the recess on the bolt end part and the socket walls between the depressions and in the inoperative position being positioned in the slots in the depressions where the balls are free for limited radial movement with respect to the socket.

References Cited
UNITED STATES PATENTS

| | | | |
|---|---|---|---|
| 1,692,825 | 11/1928 | Ganz | 70—232 |
| 1,692,826 | 11/1928 | Ganz | 70—231 |
| 1,921,225 | 8/1933 | Hawkins | 70—259 |
| 2,470,256 | 5/1949 | McIlroy | 285—277 |
| 2,501,581 | 3/1950 | Rieger | 16—143 |

MARVIN A. CHAMPION, Primary Examiner

R. L. WOLFE, Assistant Examiner

U.S. Cl. X.R.

70—34, 386